US007689871B2

(12) United States Patent
Hagman

(10) Patent No.: US 7,689,871 B2
(45) Date of Patent: Mar. 30, 2010

(54) METHOD FOR MONITORING A SYSTEM

(75) Inventor: Per Hagman, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1315 days.

(21) Appl. No.: 11/125,425

(22) Filed: May 9, 2005

(65) Prior Publication Data

US 2005/0268178 A1 Dec. 1, 2005

(30) Foreign Application Priority Data

May 7, 2004 (DE) .................. 10 2004 022 624

(51) Int. Cl.
G06F 11/00 (2006.01)
(52) U.S. Cl. .................. 714/47; 709/201; 709/202; 709/203; 709/208; 709/209; 709/210; 709/211; 700/2; 700/19; 700/20; 714/51; 714/55; 714/735; 714/736; 714/742
(58) Field of Classification Search ......... 709/201–203, 709/208–211; 714/51, 55, 735, 736, 742
See application file for complete search history.

(56) References Cited

U.S. PATENT DOCUMENTS 6,941,247 B2 * 9/2005 Voigt et al. ............... 702/188
7,277,783 B2 * 10/2007 Predelli ..................... 701/48
2001/0016789 A1 * 8/2001 Staiger ....................... 701/1
2003/0105537 A1 * 6/2003 Crispin et al. ............. 700/20
2004/0225381 A1 * 11/2004 Ritz et al. .................. 700/26

FOREIGN PATENT DOCUMENTS

| DE | 198 26 131 | 12/1999 |
|---|---|---|
| DE | 102 05 809 | 12/2002 |
| EP | 1 219 489 | 7/2002 |

OTHER PUBLICATIONS

L. Ferrigno, "A Bluetooth-based proposal of intrument wireless interface", May 19-20, 2002, pp. 72-77.*

* cited by examiner

Primary Examiner—Robert Beausoliel
Assistant Examiner—Jeison C Arcos
(74) Attorney, Agent, or Firm—Kenyon & Kenyon LLP

(57) ABSTRACT

A method for monitoring a system, having a control unit defined as a master and a number of control units defined as slaves, with the aid of a monitoring module, in which in reply to an inquiry from the master and the slaves a response is given in each instance and a joint response provided on the basis of these responses is checked by the monitoring module.

12 Claims, 2 Drawing Sheets

METHOD FOR MONITORING A SYSTEM

FIELD OF THE INVENTION

The present invention relates to a method for monitoring a system, a system having several control units as well as a computer program and a corresponding computer program product for implementing the method.

BACKGROUND INFORMATION

Control units, particularly engine control units, are normally monitored according to a 3-level concept. In this concept, a monitoring module dependent on a function computer plays a central role. The monitoring module monitors a function computer by inquiry-response communication. In this connection, the monitoring module checks whether responses of the function computer are correct and/or whether they arrived at a right time.

Against the background of ever more complex systems having a multitude of control units there exists a need for methods with the aid of which the monitoring of systems of this kind can be implemented safely and with little expense.

SUMMARY OF THE INVENTION

The present invention relates to a method for monitoring a system, having one control unit defined as a master and a number of control units defined as slaves, with the aid of a monitoring module in which in reply to an inquiry the master and the slaves each provide one response and the monitoring module checks a joint response provided on the basis of these responses. With the aid of the present invention it is possible to monitor, in an individual fail-safe manner, software that is distributed over several control units within the system. Another advantage is the fact that in implementing this method, the software in the monitoring module and an inquiry-response communication, which in conventional methods occurs between the monitoring module and a function computer, remain unchanged.

It is preferably provided that the joint response is ascertained by an algorithm. In the process, the responses of the control units are taken into consideration. The monitoring module is influenced in its function only indirectly by the actual method and the algorithm. Since the monitoring module only receives a joint response, the method may be used to monitor arbitrarily many control units in highly complex systems.

A refinement of the present invention provides for the inquiry provided particularly by the monitoring module to be checked by each control unit as to whether this inquiry is correct or false. As a function of this, each control unit may provide a correct or a definedly false response.

The response Antw to a correct inquiry is provided as a function of an inquiry identification code Frage_Id defining the inquiry and of a control unit identification code Steuerg_Id defining the control unit. The response Antw for example is:

$$Antw=(Frage\_Id+1)*Steuerg\_Id \qquad (1)$$

This allows for a precise assignment of the responses Antw. The control unit identification codes Steuerg_Id for the master as well as for the slaves are individually defined prime numbers.

A preferred embodiment of the present invention provides for the joint response to be provided taking into consideration one response defined as correct and one true response from one of the control units respectively. With little effort, this comparison between actual values and setpoint values allows for reliably detecting faults within the system and consequently, if indicated, for taking measures to rectify such faults.

The joint response g_Antw depends, among other things, on a defined joint response g_Antw_d according to the following formula:

$$g\_Antw\_d=M\_Antw-\Sigma S\_Antw\_d \qquad (2)$$

where M_Antw corresponds to the response of the master and $\Sigma S\_Antw\_d$ corresponds to the sum of the responses of the slaves defined as correct.

The joint response g_Antw is calculated according to the formula for example:

$$g\_Antw=g\_Antw\_d+\Sigma S\_Antw\_w \qquad (3)$$

as a function of the defined joint response g_Antw_d and a sum of the true responses of the slaves $\Sigma S\_Antw\_w$.

In this procedure for calculating the joint response, therefore, the defined joint response g_Antw_d is defined in a first step by subtracting the responses of the slaves $\Sigma S\_Antw\_d$ defined as correct and of the master response M_Antw or the response of the function computer. In a next step, the received true responses of the slaves $\Sigma S\_Antw\_w$ are added to the defined joint response g_Antw_d. If the true responses of the slaves S_Antw_w are correct, then the joint response g_Antw will have the value of the master response M_Antw. The monitoring module is now able to determine whether or not a fault exists within the system by checking merely one value for the joint response g_Antw.

It is provided for the inquiries and responses to be exchanged between the master, in particular of the function computer within the master, and the slaves. The monitoring module is not affected by this possibly extensive inquiry-response communication. In the process, the monitoring module issues merely one inquiry and receives only one response in return.

The implementation of the method preferably provides for the responses of a specific slave to be checked by a specific fault counter within the master. This offers a high degree of flexibility within the system. For a concrete case, an adjustment may be made as to how many responses of one of the slaves, for example, may arrive too late without the monitoring module noticing this fact. Thus it is possible that short-term failures within a communication network of the system (bus failures), which have the consequence that responses of one of the slaves do not reach the master on time, are not interpreted as a fault within this slave and hence do not cause fault reactions within the monitoring module. Hence, unnecessary fault reactions are avoided with the aid of this fault counter within the master.

The system according to the present invention has a control unit defined as a master and a number of control units defined as slaves and a monitoring module. For monitoring this system it is provided that in reply to an inquiry the master and the slaves each provide one response and that the monitoring module checks a joint response provided on the basis of these responses. The system is designed in such a way that the monitoring may be monitored independently of a number of the control units.

The computer program according to the present invention having program code means is designed for implementing all of the steps of the method according to the present invention if this computer program is executed on a computer or a corresponding processing unit, particularly a control unit in the system according to the present invention. The computer program product according to the present invention having program code means that are stored on a computer-readable storage medium is provided for implementing the method according to the present invention if the computer program is executed on a computer or a corresponding processing unit, in particular on a control unit in the system according to the present invention.

DETAILED DESCRIPTION

Figure 1:
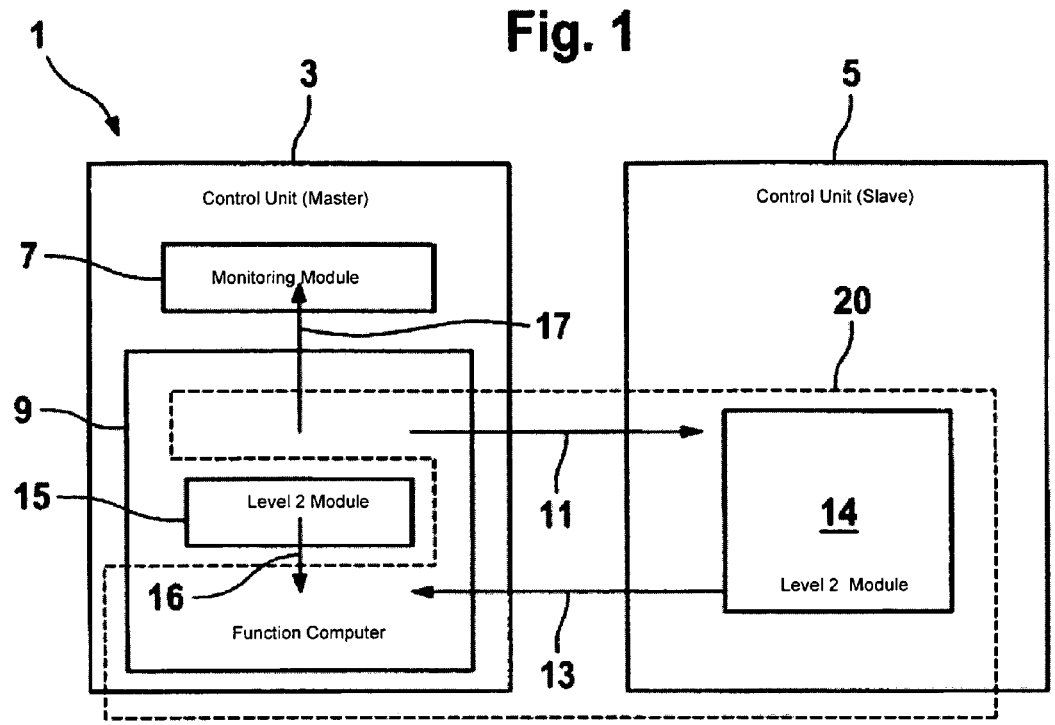
FIG. 1 schematically depicts a preferred specific embodiment of the system according to the present invention.

The system 1 according to the present invention shown in FIG. 1 includes several control units 3, 5. In this case, one of the control units takes the form of an engine control unit, for example, and is defined as master 3. Within this master 3 there is a monitoring module 7 as well as a function computer 9. Because of this refinement, master 3 has a higher-order position and/or function with respect to the other control units of system 1 within the entire system at least in the implementation of the method according to the present invention. For the purpose of clarity, FIG. 1 shows only one additional control unit defined as slave 5, although system 1 may comprise an arbitrary number of additional control units or slaves 5.

It is provided for a software for controlling the system to be distributed over all slaves 5. In this instance, slaves 5 receive level 1 modules and level 2 modules 14, which in comparison to conventional systems are placed in slaves 5 and not in master 3.

Master 3 likewise comprises a level 2 module 15, which is monitored via an inquiry-response communication by monitoring module 7. As shown in more detail in subsequent FIGS. 2 and 3, inquiries 11 are channeled to slaves 5 with the aid of an algorithm for implementing the method according to the present invention. In the process, these inquiries 11 will be sent directly from monitoring module 7 or from function computer 9, if function computer 9 has received inquiries 11, to slaves 5.

For exchanging inquiries 11 and responses 13 based on them, a communication medium exists between master 3 and slaves 5. This takes the form of a CAN bus (controller area network) for example. It is provided for monitoring module 7 not to have a direct connection to slaves 5, which is why inquiries 11 are passed on by function computer 9. The communication between master 3 and slaves 5 thus occurs with the exclusion of monitoring module 7 within dashed region 20.

In implementing the method according to the present invention, a response 13 is calculated on the basis of inquiry 11 within level 2 module 14 in slaves 5 and is sent back to master 3. In addition, a response 16 is calculated within level 2 module 15 of master 3. For monitoring system 1, monitoring module 7 receives only one joint response 17 on the basis of responses 13 and 16. On the basis of this one joint response 17 it is possible to determine in an individual fail-safe manner the existence of a fault of system 1, which can have an arbitrary number of control units 3, 5, and to take an appropriate measure for rectifying this at least one fault.

The system according to the present invention is thus designed in such a way that monitoring module 7 in implementing the method according to the present invention merely detects master 3, while slaves 5 are nonexistent for monitoring module 7 even in an arbitrarily large number. Accordingly, for implementing the method according to the present invention, a conventional monitoring software of monitoring module 7 may be retained. Thus, everything in system 1 located outside of dashed region 20 does not have to be changed.

Figure 2:
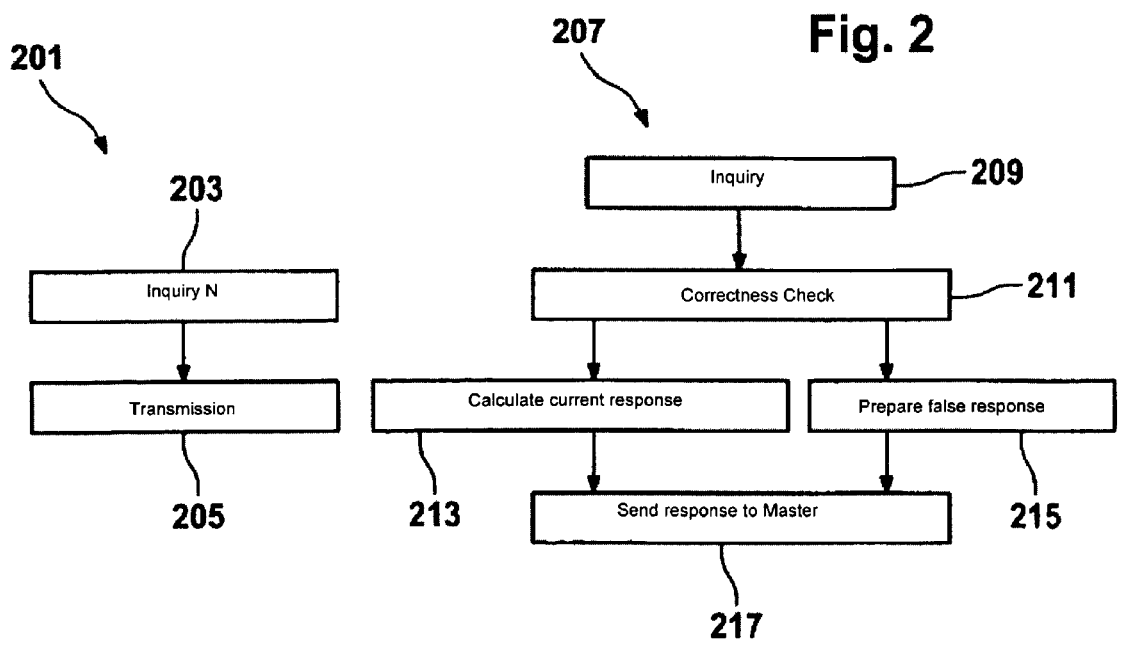
FIG. 2 shows a first aspect of a preferred specific embodiment of the method according to the present invention in a schematic diagram.

In a schematic representation, FIG. 2 shows on the left a diagram for the relaying 201 one of the above-mentioned inquiries. Based on an existence 203 of an inquiry N, there is a transmission 205 of the inquiry N supplemented by an inquiry identification code Frage_Id(N) to one of the altogether k slaves i.

On the right, FIG. 2 shows a diagram in a schematic representation for the calculation 207 of a response 213, 215 to the inquiry within level 2 module of one of the slaves i. The inquiry received 209 is first checked for correctness 211. Vis-á-vis $N_{Frage}$, monitoring module may make different inquiries N. Correct inquiries N accordingly have valid values between zero and ($N_{Frage}$−1). After a specific inquiry has been checked for correctness 211, it is provided for slave i to calculate a correct response 213. This correct response 213 is sent to the master in a concluding step 217. In case the check for correctness 211 yields the result that the inquiry is not correct, then slave i prepares a defined false response 215 which is likewise sent to the master in concluding step 217.

In the calculation 207 of responses 213, 215 it is provided for each of the k slaves i to respond to each inquiry only once, thus ensuring that every safety-related individual fault is discovered. The basis of this is that each of the k slaves i has its own control unit identification code Steuerg_Id(i). This control unit identification code Steuerg_Id(i) is e.g. a prime number. Correct response 213 is preferably described by the formula:

$$Antw=(Frage\_Id(N)+1)*Steuerg\_Id(i). \qquad (1)$$

This correct response Antw depends furthermore on the inquiry identification code Frage_Id(N) defined for each question N. Thus it is possible to determine in an individual fail-safe manner a type of fault on the basis of the inquiry identification code Frage_Id(N) and its origin via the control unit identification code Steuer_Id(i). In the possible presence of a fault, slave i also provides the master with the correct response 213 to a correct inquiry, but with a false value.

The inquiry is passed on to the slaves together with the inquiry identification code Frage_Id(N). Together with the response, the slaves send this inquiry identification code Frage_Id on to the master. This ensures that the master knows to which inquiry a response corresponds.

Figure 3:
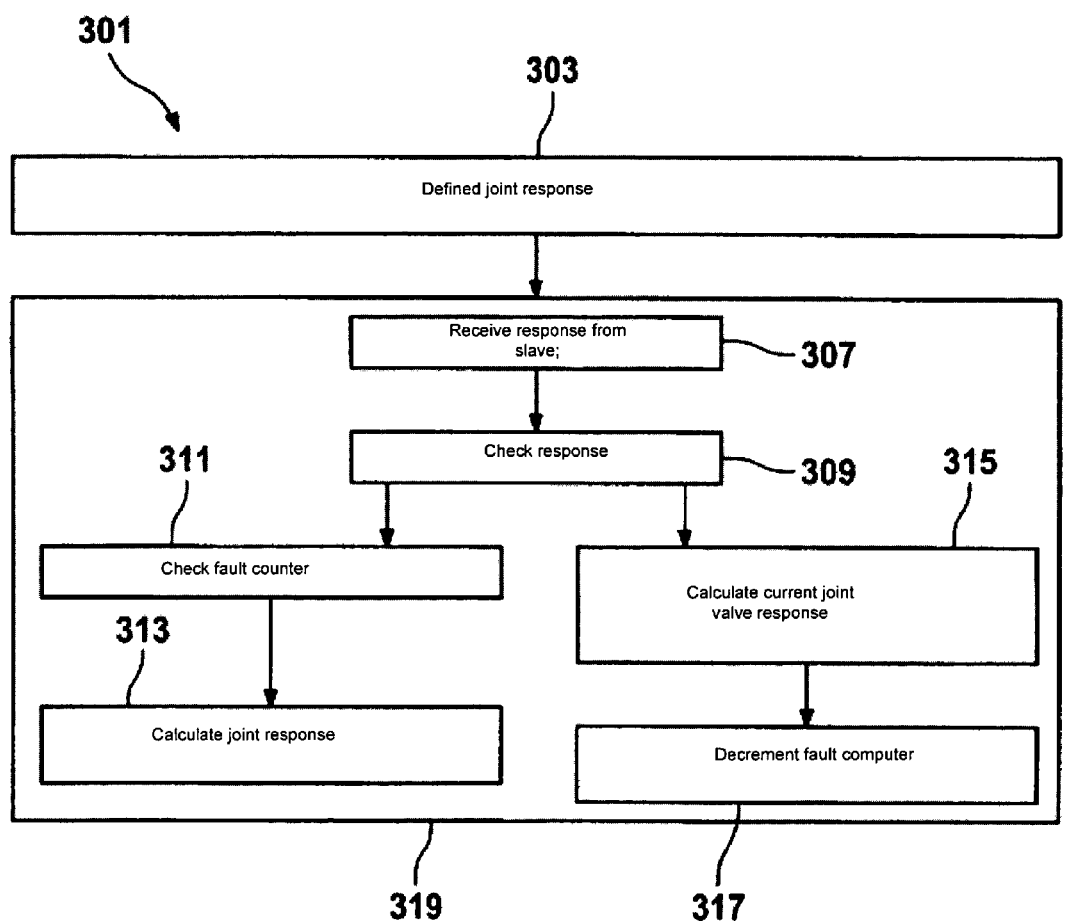
FIG. 3 shows a further aspect of a preferred specific embodiment of the method according to the present invention in a schematic diagram.

In a schematic diagram, FIG. 3 shows details for the calculation 301 of a joint response based on the responses of k slaves i and the response of the master. To this end, in a first step 303, a defined joint response g_Antw_d is provided according to the formula:

$$g\_Antw\_d=M\_Antw-\Sigma S\_Antw\_d(i) \qquad (2)$$

comprising the response of the master M_Antw and the sum of the responses of the k slaves i $\Sigma S\_Antw\_d(i)$ defined as correct. This defined joint response g_Antw_d is taken into consideration in a second step 319 for determining the actual, true joint response g_Antw.

It is provided for this second step 319 to be performed for all k slaves i. If slave i is active in accordance with a first partial step 307, the master, in a response reception step 307, receives from this slave i a new true response S_Antw_w(i). An existence of a true response S_Antw_w(i) is checked in an existence step 309. If the response S_Antw_w(i) has arrived, then the two W check steps 311, 313 are performed in a left branch. If no response arrives from slave i, then the two F check steps 315, 317 are performed within a right branch.

In the first W check step 311, the value of a fault counter S_Z(i) is checked for correctness for each slave i. If this is the case, then the joint response g_Antw is calculated in the second W check step 315. For this purpose, an already existing value for the joint response g_Antw(i) for each individual slave i has added to it a value for the true response of this slave i S_Antw_w(i) such that for a specific current i-dependent value of the joint response the following holds:

$$g\_Antw(i)=g\_Antw(i-1)+S\_Antw\_w(i)$$

In addition, a value of the fault counter S_Z(i) is reduced by 1.

The actual, true joint response g_Antw results as a whole from the defined joint response g_Antw_d calculated in first step 303 and the sum of all k responses S_Antw_w(i) of all k slaves i:

$$g\_Antw=g\_Antw\_d+\Sigma S\_Antw\_w(i) \quad (3)$$

which, following the insertion of formula (2), yields:

$$g\_Antw=M\_Antw-\Sigma S\text{-}Antw\text{-}d(i)+\Sigma S\_Antw\_w(i).$$

If the system works without fault, then the sum of the responses of the k slaves i defined as correct corresponds to $\Sigma S\_Antw\_d(i)$ as setpoint value of the sum of the true responses $\Sigma S\_Antw\_w(i)$ as actual value. This means, however, that the joint response g_Antw corresponds to the response M_Antw of the master. This is the only criterion to be checked by the monitoring module.

In the event that slave i does not provide a response, a current value of the joint response g_Antw(i) is calculated in F check step 315 on the right according to the following formula, having S_Antw_d(i) as the defined response of slave i:

$$g\_Antw(i)=g\_Antw(i-1)+S\_Antw\_d(i)*(Frage\_Id+1).$$

For every slave i there is a fault counter S_Z(i) and a maximum number of faults which are allowed to arrive too late or not at all. If a response from one of the k slaves i in a calculation of joint response g_Antw in first F check step 315 has not arrived, then fault counter S_Z(i) is incremented by 3. As long as the fault counter for slave i does not exceed the admissible maximum value, the correct response S_Antw_w(i) of slave i is added to the joint response g_Antw. If a response of slave i arrives too late and the corresponding fault counter S_Z(i) has a higher value than allowed, then the correct response S_Antw_w(i) is not added to the joint response g_Antw. Consequently, the monitoring module will receive a false response. If a response of slave i S_Antw_w(i) arrives at the right time, then the value of the corresponding fault counter S_Z(i) is decremented by 1 within second F check step 319. The lowest value of fault counter S_Z(i) is zero. If the value of fault counter S_Z(i) has exceeded the maximum value allowed, then fault counter S_Z(i) must again reach the value zero before a response is again allowed to arrive too late.

Assuming that a maximum value for the fault counter is S_Z(i)=6, for example, then if a slave response S_Antw_w(i) arrives too late, fault counter S_Z(i) is incremented by 3, i.e. S_Z(i)=3. If the next response arrives at the right time, then S_Z(i) is decreased by 1 such that S_Z(i)=2. In the event that a third response arrives too late, the correct slave response must not be added since the fault counter has not yet reached the value zero after a slave response has arrived at the right time. That is to say, the condition that S_Z(i) is greater than a maximum value, does not have to be the sole criterion for a maximum admissible value.

The present invention, for example, is suitable for an application for monitoring an unintentional acceleration of a vehicle. In this instance, the engine control unit is defined as master. With the exception of the engine control unit, the slaves are made up of control units containing the safety-related software for the acceleration. The present invention, however, may also be applied to other systems in which monitoring is based on a similar inquiry-response communication.

What is claimed is:

1. A method for monitoring a system that includes a control unit serving as a master, a plurality of control units serving as slaves, and a monitoring module, comprising:
   providing, in reply to an inquiry, in each instance a response from the master and the slaves;
   checking by the monitoring module a joint response provided on the basis of responses of the providing step, wherein the joint response is provided taking into consideration one response defined as correct and one true response of the control unit respectively; and
   checking by the control unit an inquiry as to whether the inquiry is correct or false and in which as a function of this the response is ascertained;
   wherein the response to a correct inquiry is provided as a function of an inquiry identification code defining the inquiry and a control unit identification code defining the control unit, and
   wherein the response Antw to a correct question is ascertained according to the formula: Antw=(Frage_Id+1)* Steuerg_Id using the inquiry identification code Frage_Id and the control unit identification code Steuerg_Id.

2. The method as recited in claim 1, wherein the joint response is ascertained by an algorithm.

3. The method as recited in claim 1, wherein inquiries and responses are exchanged between the master and the slaves.

4. The method as recited in claim 1, in which responses of a specific slave are checked by a specific fault counter within the master.

5. A method for monitoring a system that includes a control unit serving as a master, a plurality of control units serving as slaves, and a monitoring module, comprising:
   providing, in reply to an inquiry, in each instance a response from the master and the slaves; and
   checking by the monitoring module a joint response provided on the basis of responses of the providing step;
   wherein the joint response is provided taking into consideration one response defined as correct and one true response of the control unit respectively, and
   wherein the joint response g_Antw is ascertained according to the formula: g_Antw=g_Antw_d+$\Sigma$S_Antw_w (3) taking into consideration a sum of the true responses $\Sigma$S_Antw_w of the slaves.

6. The method as recited in claim 5, wherein a defined joint response is provided as a function of a response of the master and a sum of the responses of the slaves defined as correct.

7. The method as recited in claim 5, wherein the defined joint response g_Antw_d is ascertained according to the formula:

g_Antw_d=M_Antw−ΣS_Antw_d using the response M_Antw of the master and the sum of the responses ΣS_Antw_d of the slaves defined as correct.

8. The method as recited in claim 7, further comprising:
checking by the control unit an inquiry as to whether the inquiry is correct or false and in which as a function of this the response is ascertained.

9. The method as recited in claim 8, wherein the response to a correct inquiry is provided as a function of an inquiry identification code defining the inquiry and a control unit identification code defining the control unit.

10. The method as recited in claim 9, in which the response Antw to a correct question is ascertained according to the formula:

Antw=(Frage_Id+1)*Steuerg_Id using the inquiry identification code Frage_Id and the control unit identification code Steuerg_Id.

11. A system, comprising:
a control unit serving as a master;
a plurality of control units serving as slaves; and
a monitoring module, wherein in reply to an inquiry of the master and the slaves a response is given in each instance, and the monitoring module checks a joint response provided on the basis of the responses, wherein the joint response is provided taking into consideration one response defined as correct and one true response of the control unit respectively;
wherein the control unit checks an inquiry as to whether the inquiry is correct or false and in which as a function of this the response is ascertained;
wherein the response to a correct inquiry is provided as a function of an inquiry identification code defining the inquiry and a control unit identification code defining the control unit, and
wherein the response Antw to a correct question is ascertained according to the formula: Antw=(Frage_Id+1)*Steuer_Id using the inquiry identification code Frage_Id and the control unit identification code Steuerg_Id.

12. A computer-readable medium having a computer program that is executable by a computer processor, comprising:
a program code arrangement having program code for monitoring a system that includes a control unit serving as a master, a plurality of control units serving as slaves, and a monitoring module, by performing the following:
providing, in reply to an inquiry, in each instance a response from the master and the slaves; and
checking by the monitoring module a joint response provided on the basis of responses of the providing step, wherein the joint response is provided taking into consideration one response defined as correct and one true response of the control unit respectively;
wherein the control unit cheeks an inquiry as to whether the inquiry is correct or false and in which as a function of this the response is ascertained,
wherein the response to a correct inquiry is provided as a function of an inquiry identification code defining the inquiry and a control unit identification code defining the control unit, and
wherein the response Antw to a correct question is ascertained according to the formula: Antw=(Frage_Id+1)*Steuerg_Id using the inquiry identification code Frage_Id and the control unit identification code Steuerg_Id.

* * * * *